US010334043B2

(12) United States Patent
Miller et al.

(10) Patent No.: US 10,334,043 B2
(45) Date of Patent: *Jun. 25, 2019

(54) SECURE SHARING OF STORAGE AREA NETWORKS IN A CLOUD (71) Applicant: International Business Machines Corporation, Armonk, NY (US)

(72) Inventors: Robert Miller, Rochester, MN (US); Brian A. Nordland, Rochester, MN (US); Kiswanto Thayib, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 453 days.

This patent is subject to a terminal disclaimer.

(21) Appl. No.: 14/791,008

(22) Filed: Jul. 2, 2015

(65) Prior Publication Data

US 2016/0357469 A1 Dec. 8, 2016

Related U.S. Application Data (63) Continuation of application No. 14/732,607, filed on Jun. 5, 2015.

(51) Int. Cl.
G06F 15/16 (2006.01)
H04L 29/08 (2006.01)
G06F 3/06 (2006.01)

(52) U.S. Cl.
CPC ........ H04L 67/1097 (2013.01); G06F 3/0604 (2013.01); G06F 3/067 (2013.01);
(Continued)

(58) Field of Classification Search
CPC ............ H04L 67/1097; H04L 67/2819; G06F 3/0604; G06F 3/0622; G06F 3/0631; G06F 3/0632; G06F 3/067
See application file for complete search history.

(56) References Cited

U.S. PATENT DOCUMENTS 7,263,590 B1 * 8/2007 Todd ...................... G06F 12/02
707/999.202
8,806,041 B1 8/2014 Lopez Suarez et al.
(Continued)

FOREIGN PATENT DOCUMENTS

CN 103957237 A 7/2014

OTHER PUBLICATIONS

"IBM BCRS Italy Cloud Provisioning," IP.com Prior Art Database Disclosure, IP.com Disclosure No. IPCOM000239412D, Nov. 5, 2014; http://priorart.ip.com/IPCOM/000239412.
(Continued)

Primary Examiner — Ryan J Jakovac
(74) Attorney, Agent, or Firm — Patterson + Sheridan, LLP (57) ABSTRACT Techniques disclosed herein describe performing client-requested disk management operations to storage disk units of a storage area network (SAN). A proxy service receives a request from a client of a SAN provider to perform a disk management operation on one or more storage disk units of the SAN provider. The proxy service evaluates a configuration of storage disk units allocated to the client to determine whether the request is valid. If valid, the proxy service performs the requested action to the specified storage disk units on behalf of the client.

20 Claims, 6 Drawing Sheets (52) U.S. Cl.
CPC .......... *G06F 3/0622* (2013.01); *G06F 3/0631* (2013.01); *G06F 3/0632* (2013.01); *H04L 67/2819* (2013.01)

(56) References Cited

U.S. PATENT DOCUMENTS

| | | | |
|---|---|---|---|
| 8,843,998 B2 | 9/2014 | Fu et al. | |
| 8,863,299 B2 | 10/2014 | Sharma et al. | |
| 8,893,004 B2 | 11/2014 | Drews et al. | |
| 9,218,252 B1* | 12/2015 | Revur | G06F 17/30371 |
| 2006/0174000 A1* | 8/2006 | Graves | H04L 63/10 |
| | | | 709/225 |
| 2007/0143497 A1* | 6/2007 | Kottomtharayil | |
| | | | G06F 17/30067 |
| | | | 709/238 |
| 2011/0302312 A1 | 12/2011 | McCrory | |
| 2013/0297800 A1 | 11/2013 | Considine et al. | |
| 2013/0332685 A1 | 12/2013 | Kripalani et al. | |
| 2014/0075565 A1 | 3/2014 | Srinivasan et al. | |
| 2014/0108351 A1 | 4/2014 | Nallathambi et al. | |
| 2014/0330936 A1 | 11/2014 | Factor et al. | |
| 2015/0280959 A1* | 10/2015 | Vincent | H04L 67/1097 |
| | | | 709/203 |

OTHER PUBLICATIONS

International Business Machines Corporation: "Appendix P: List of IBM Patents or Patent Applications Treated as Related", Jul. 2, 2015.
List of IBM Patents or Applications Treated as Related.
IBM U.S. Appl. No. 14/732,607, filed Jun. 5, 2015.

\* cited by examiner

SECURE SHARING OF STORAGE AREA NETWORKS IN A CLOUD

CROSS-REFERENCE TO RELATED APPLICATION

This application is a continuation of co-pending U.S. patent application Ser. No. 14/732,607, filed Jun. 5, 2015. The aforementioned related patent application is herein incorporated by reference in its entirety.

BACKGROUND

Embodiments presented herein generally relates to storage area networks (SAN), and more specifically, to providing SAN management operations to clients of a SAN provider.

A storage area network (SAN) is a dedicated network that provides access to block level data storage. A SAN storage infrastructure has a network of physical storage devices, such as hard disk drives and solid state drives. A SAN storage provider may abstract storage units of the devices into logical disk units by aggregating the devices into storage pools. The SAN storage provider then maps the logical disk units to physical locations on the storage devices. Further, the SAN storage provider then assigns the logical disk units to client systems (e.g., physical computing systems, virtual machine instances, and the like). To a given client system, the logical disk units may appear as locally-attached storage devices.

In some cases, a given client may want to perform management operations to the disk units allocated to the client system. For example, the client may want to create a snapshot—a near instantaneous copy of a set of data at a given point in time—of data stored in a given disk unit to another disk unit. Typically, to perform management operations to the allocated disk units, the client must obtain access to the management interface of the SAN storage provider. However, because the SAN management interface generally allows unfettered access to the entire SAN storage infrastructure (including disk units not allocated to the client), an administrator of the SAN storage provider may be reluctant to provide a client access to the management operations.

SUMMARY

One embodiment presented herein describes a method. The method generally includes receiving a management request from a client of a storage area network (SAN) provider to perform a disk management operation on one or more storage disk units of the SAN provider. A configuration of storage disk units allocated to the client is evaluated to determine whether the management request is valid. Upon determining that the management request is valid based on the configuration, the disk management operation is performed to the one or more storage disk units.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Embodiments presented herein describe techniques for performing client-requested disk management operations in a storage area network (SAN) infrastructure. In one embodiment, a SAN provider includes a trusted system. The trusted system provides a proxy service that performs management operations to SAN disk units on behalf of requesting clients. The proxy service includes credentials of a management interface of the SAN provider. The credentials allow the proxy service to access the management interface and, in turn, the underlying SAN infrastructure, such as logical disk units provided by the SAN. Further, the proxy service includes client credentials the service uses to authenticate client systems requesting access to disk units on the SAN. Further, the proxy service includes configuration information that describes, e.g., client system addresses, a mapping of disk units to client systems, access privileges of each client, and the like.

In one embodiment, client systems of the SAN provider access (e.g., via an interface executing on the system) the proxy service. As an example, assume that a client system wants to perform a management operation to a specified set of disk units A-B, e.g., create a snapshot of disk unit A to disk unit B. The client system authenticates itself with the proxy service. During authentication, the proxy service identifies what disk units are allocated to the client system, what privileges are available to the client system, and the like. Once authenticated, the proxy service determines whether the client system is authorized to request the management operation be performed on the specified disk units. Continuing the previous example, the proxy service may determine whether the client system has access to disk units A and B, e.g., based on the configuration information associated with the client system. If so, the proxy service performs the operation. Otherwise, the proxy service may return an error to the client system.

Advantageously, deploying a trusted system to act as a proxy between a SAN provider and a client system affords an additional layer of security to the SAN infrastructure. Through such an approach, a client system may request to access, via a proxy interface, management operations targeted at disk units allocated to that client system (e.g., and not to other disk units accessible through the SAN management interface). The proxy service validates requests by the clients and performs the specified management operations on behalf of the client system.

Figure 1:
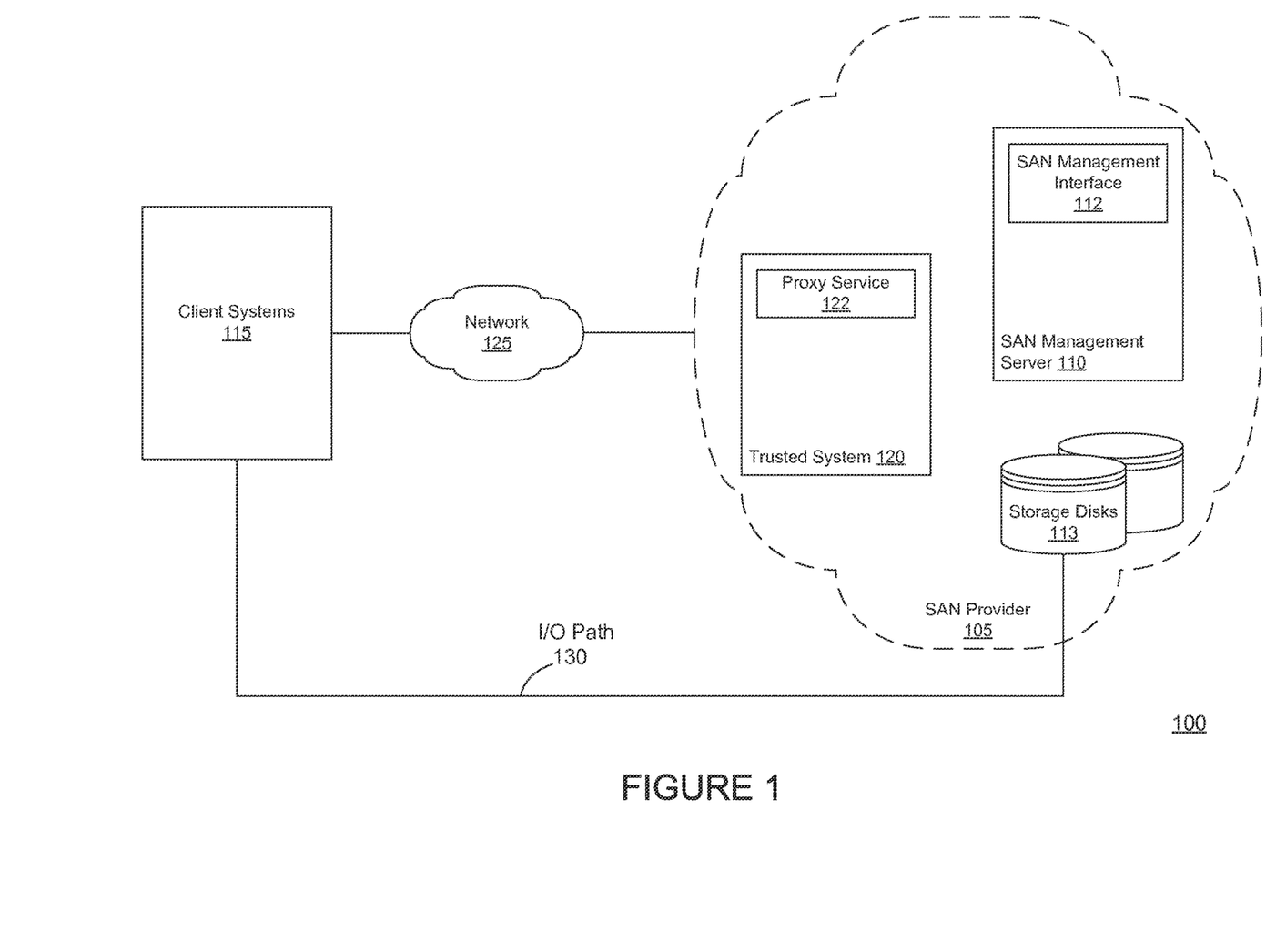
FIG. 1 illustrates an example computing environment, according to one embodiment.

FIG. 1 illustrates an example computing environment 100, according to one embodiment. As shown, computing environment 100 includes a storage area network (SAN) provider 105 and multiple client systems 115, each connected via a network 125 (e.g., the Internet). The SAN provider 105 includes one or more storage disks 113, e.g., hard disk drives, solid state drives, and the like. In one embodiment, the storage disks 113 are aggregated to provide logical storage to the client systems 115. The logical storage may be divided into disk units of that can be allocated to the client systems 115. To a given client system 115, allocated disk units may appear as a locally attached storage device. Likewise, the client system 115 may perform traditional storage operations to an allocated disk unit as if the disk unit were a locally attached storage device. For example, the client system 115 can perform read and write I/O operations to the allocated disk units (as depicted by I/O path 130 linking the client systems 115 and the storage disks 113).

In one embodiment, the SAN provider 105 further includes a SAN management server 110. The SAN management server 110 itself includes a management interface 112. The management interface 112 performs operations relating to the SAN infrastructure, such as creating logical disk units from the physical storage disks 113, allocating the disk units to client systems 115, performing management operations to the disk units (e.g., copy operations from one disk unit to another), and the like.

In one embodiment, the SAN provider 105 further includes a trusted system 120. The trusted system 120 includes a proxy service 122. The proxy service 122 provides access to the SAN management interface 112 by client systems 115 (e.g., via a proxy interface executing on the client system 115). To provide such access, the proxy service 122 may evaluate configuration information of each of the client systems 115. Such configuration information may describe disk units that are allocated to the client system 115 and access privileges of the client system 115. The proxy service 122 may allow each client system 115 to perform management operations (provided by the SAN management interface 112) to disk units allocated to the client system 115 without interfering with the I/O path 130 between the client system 115 and the storage disks 113. Further, the proxy service 122 prohibits a given client system 115 from accessing disk units not allocated to the client system 115.

Figure 2:
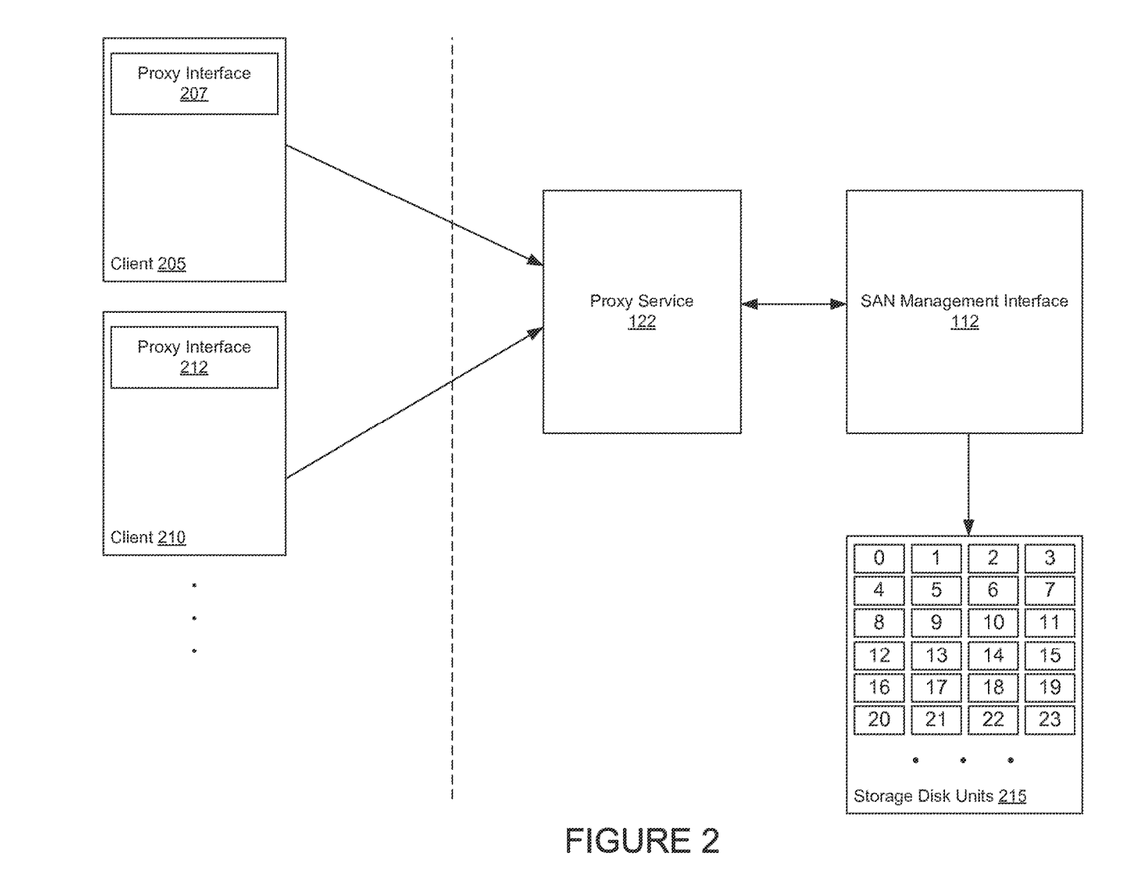
FIG. 2 illustrates an example of performing a client-requested management operation to a storage area network (SAN) disk unit, according to one embodiment.

FIG. 2 illustrates an example of performing a SAN management operation through the proxy service 122. FIG. 2 depicts, to the left of the dotted line, clients 205 and 210. FIG. 2 depicts, to the right of the dotted line, components of the SAN provider, i.e., the proxy service 122, the SAN management interface 112, and storage disk units 215 of the storage disks 113. In this example, the clients 205 and 210 are attempting to perform separate management operations to the storage disk units 215 (numbered from 0 to 23, and so on) that the SAN provider maintains. In this example, assume that the SAN provider allocated disk units 0-7 to client 205, and allocated disk units 8-13 to client 210.

In one embodiment, to perform a management operation to a storage disk unit 215 allocated to a given client, the client, using a proxy interface, requests via the proxy service 122. A request to the proxy service 122 may include credentials identifying the client, the storage disk units 215 on which the management operation is requested to be performed, the requested management operation, and the like. The proxy service 122, in turn, authenticates the client, e.g., using the credentials supplied by the client. Once authenticated, the proxy service 122 may validate the request provided by the client. If valid, the proxy service 122 performs the requested management operation on behalf of the client, e.g., by accessing the SAN management interface 112 using SAN provider credentials.

For example, assume that client 205 requests to create a snapshot of data stored in disk unit 0 to disk unit 1. The proxy service 122 receives the request from the client 205 and authenticates the client 205 using the client credentials. After authenticating the client 205, the proxy service 122 determines whether the request of client 205 is valid, i.e., client 205 is authorized to access the requested storage disk units 0 and 1. To do so, the proxy service 122 may evaluate the configuration of client 205. As stated, the configuration for a client system provides information such as the disk units allocated to the client by the SAN provider and access privileges granted to the client. In this case, disk units 0 and 1 are indeed allocated to client 205. Assuming that client 205 also has permission to perform snapshot operations on allocated disk units, the proxy service 122 determines that the request is valid. As a result, the proxy service 122 accesses the SAN management interface and performs the snapshot operation on behalf of client 205 without interfering with the I/O path between the client 205 and the disk units. The proxy service 122 may notify the client 205 that the operation is complete.

As another example, assume that client 210 requests to create a snapshot of data stored in disk unit 0 to disk unit 10. The proxy service 122 receives the request from the client 210 and authenticates the client 210 using the client credentials. The proxy service 122 then determines whether the request of client 210 is valid based on the configuration of the client 210. Doing so allows the proxy service 122 to determine that storage disk unit 0 is not allocated to client 210, and thus the request is invalid. As a result, the proxy service 122 rejects the request. The proxy service 122 may return an error to the client 210 describing that the management operation was not performed. Advantageously, by validating client requests to access SAN disk units via the proxy service 122, a given client is unable to access disk units not currently allocated to that client.

Figure 3:
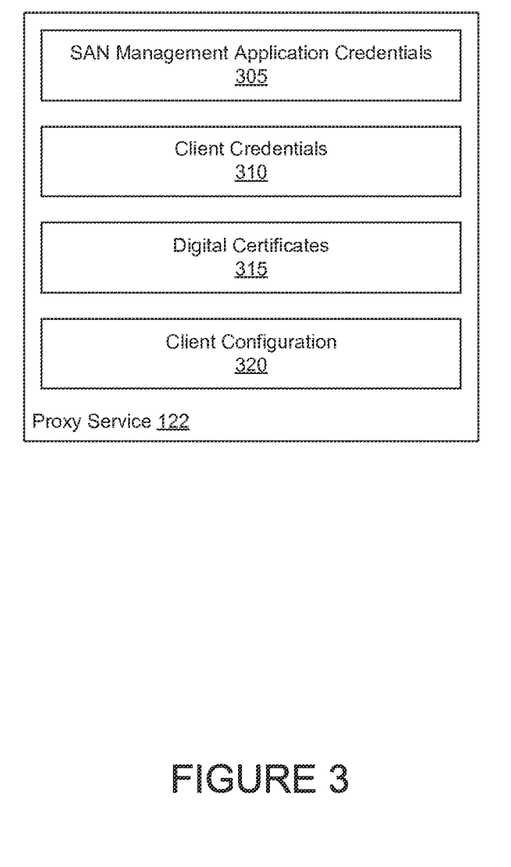
FIG. 3 illustrates a proxy service provided by a trusted system of a SAN storage provider, according to one embodiment.

FIG. 3 further illustrates the proxy service 122, according to one embodiment. As shown, the proxy service 122 includes SAN management application credentials 305, client credentials 310, digital certificates 315, and client configuration 320.

In one embodiment, the SAN management application credentials 305 allow the proxy service 122 to access the SAN management interface 112. The SAN management application credentials 305 may include a login identifier and a password that the proxy service 122 uses to access the SAN management interface 112. Once logged in, the proxy interface 122 may perform requested and valid management operations specified by a given client system.

In one embodiment, the client credentials 310 provide information used to authenticate a given client system with the proxy interface 122. For example, a client may access the proxy interface using a previously specified login identifier and password combination. The proxy service 122 may authenticate the client through the client credentials 310.

In one embodiment, the digital certificates 315 allow client systems 115 connecting to the proxy service 122 to confirm the identity of the proxy service 122. The client systems 115 may do so using traditional authentication methods. The digital certificates 315 may be digitally signed by a certificate authority common to the proxy service 122 and the SAN provider.

In one embodiment, the client configuration 320 specifies SAN disk units allocated to client systems in the SAN infrastructure. The client configuration 320 may specify which disk units are allocated to a given client. In addition, the client configuration 320 may specify access privileges to the disk units by a given client.

Figure 4:
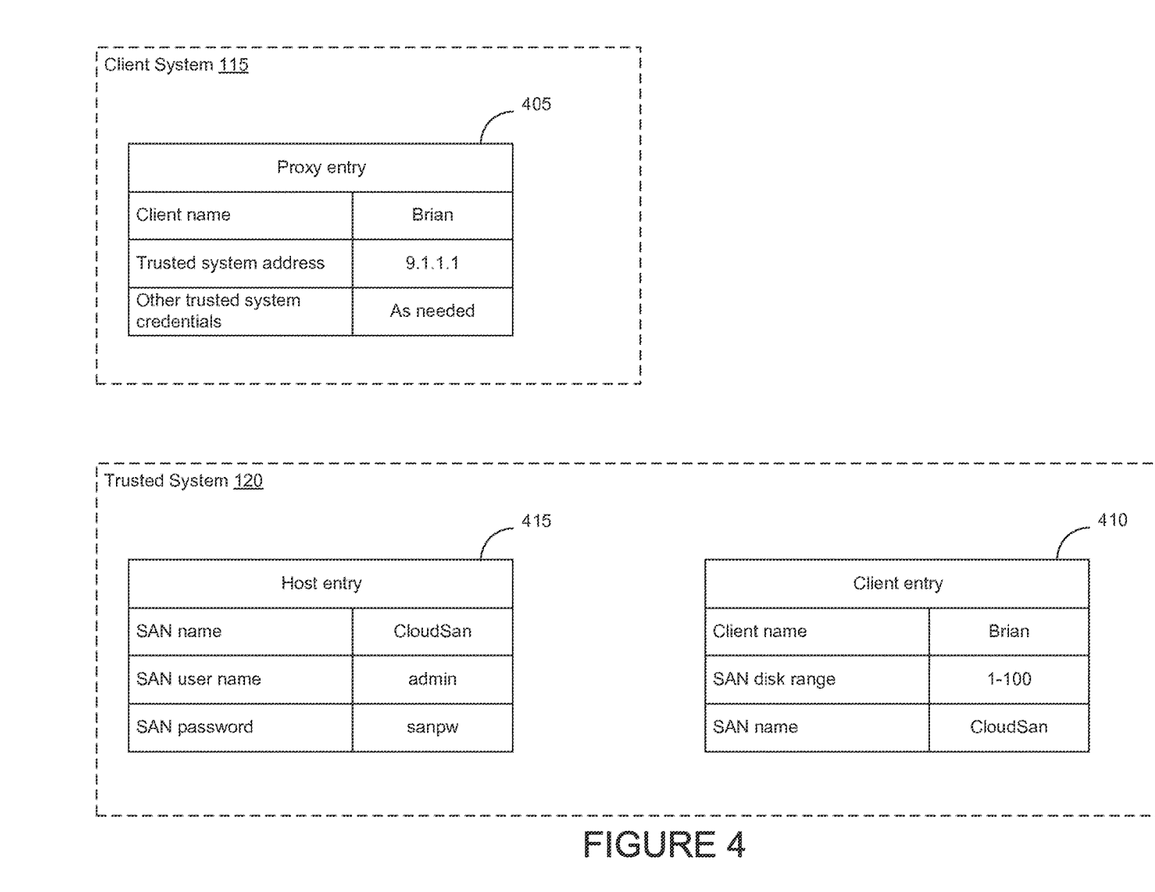
FIG. 4 illustrates example credentials and configuration entries used for a proxy service provided by a trusted system of a SAN storage provider, according to one embodiment.

FIG. 4 illustrates example credentials and configuration entries used for the proxy service 122, according to one embodiment. FIG. 4 depicts a proxy entry 405, a client entry 410, and a host entry 415.

In one embodiment, a client maintains the proxy entry 405. The proxy entry 405 includes information for accessing the proxy service 122. Illustratively, the proxy entry 405 includes information such as the name of the client accessing the proxy service 122 ("Brian"), an IP address for the trusted system executing the proxy service 122, and credentials used to authenticate the client system. Of course, the proxy entry 405 may include additional information that the client may use to identify the proxy service 122.

In one embodiment, the proxy service 122 maintains multiple client entries 410. Illustratively, the example client entry 410 associated with a given client includes the name of the client, a specified range of disk units allocated to the client, and the name of the SAN provider that allocated the disk units. Of course, a client entry 410 may include additional information associated with the client.

In one embodiment, the proxy service 122 maintains the host entry 415 for a given SAN management server 110. Of course, the proxy service 112 may maintain multiple host entries 415 for multiple SAN management servers 110. As stated, the proxy service 122 has login credentials to access the SAN management interface 112 and perform management operations through the SAN management interface 112. As shown, the host entry 415 includes the SAN provider name ("CloudSan"), a login identifier, and a password. Of course, the host entry 415 may include additional information used to identify the SAN provider and access the SAN management interface 112.

Figure 5:
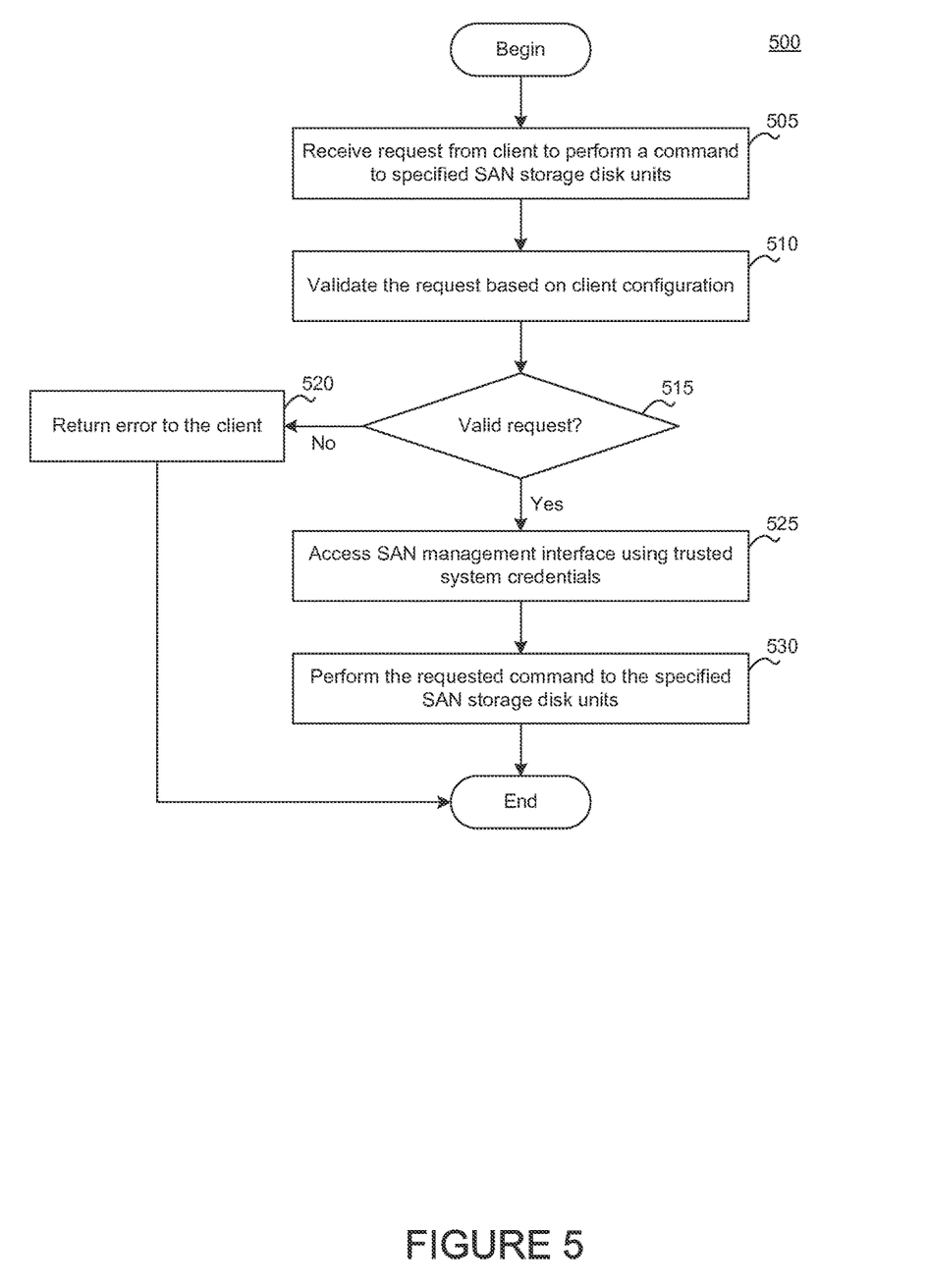
FIG. 5 illustrates a method for performing client-requested disk management operations to a SAN disk unit, according to one embodiment.

FIG. 5 illustrates a method 500 for performing a client-requested management operation to a SAN disk unit, according to one embodiment. As shown, method 500 begins at step 505, where the proxy service 122 receives a request from a given client to perform a management operation on one or more specified disk units. That is, a client may access the proxy service 122 via a proxy interface executing on the client system. The proxy interface maintains a proxy entry that allows the client to access and send the request to the proxy service 122. The proxy service 122 authenticates the client. Once authenticated, the proxy service 122 retrieves a configuration entry associated with the client.

At step 510, the proxy service 122 validates the client request based on the configuration. As stated, the request may include a specified disk management operation (a copy, mirror copy, snapshot, format, partition operation, and so on), one or more specified disk units, and the like. At step 515, the proxy service 122 can determine whether the requested action to the specified disk units is allowable based on the configuration of the client, e.g., whether the specified disk units are allocated to the client, whether the client has sufficient privileges to perform the disk management operation, etc.

If the request is not valid, then at step 520, the proxy service 122 rejects the request. To do so, the proxy service 122 may return an error to the client describing one or more reasons for the rejection, e.g., one or more of the specified disk units are not allocated to the client, the client has insufficient privileges to perform the operation, the management operation is not possible for the specified disk units, and the like. Thereafter, method 500 ends.

Otherwise, if the request is valid, then at step 525, the proxy service 122 accesses the SAN management interface 112 using credentials (e.g., login credentials, digital certificate information, and the like). Once accessed, then at step 530, the proxy service 122 performs the requested operation to the SAN storage disk units specified in the request. The proxy service 122 may then notify the client the result of the operation (e.g., whether the operation is successfully performed).

Figure 6:
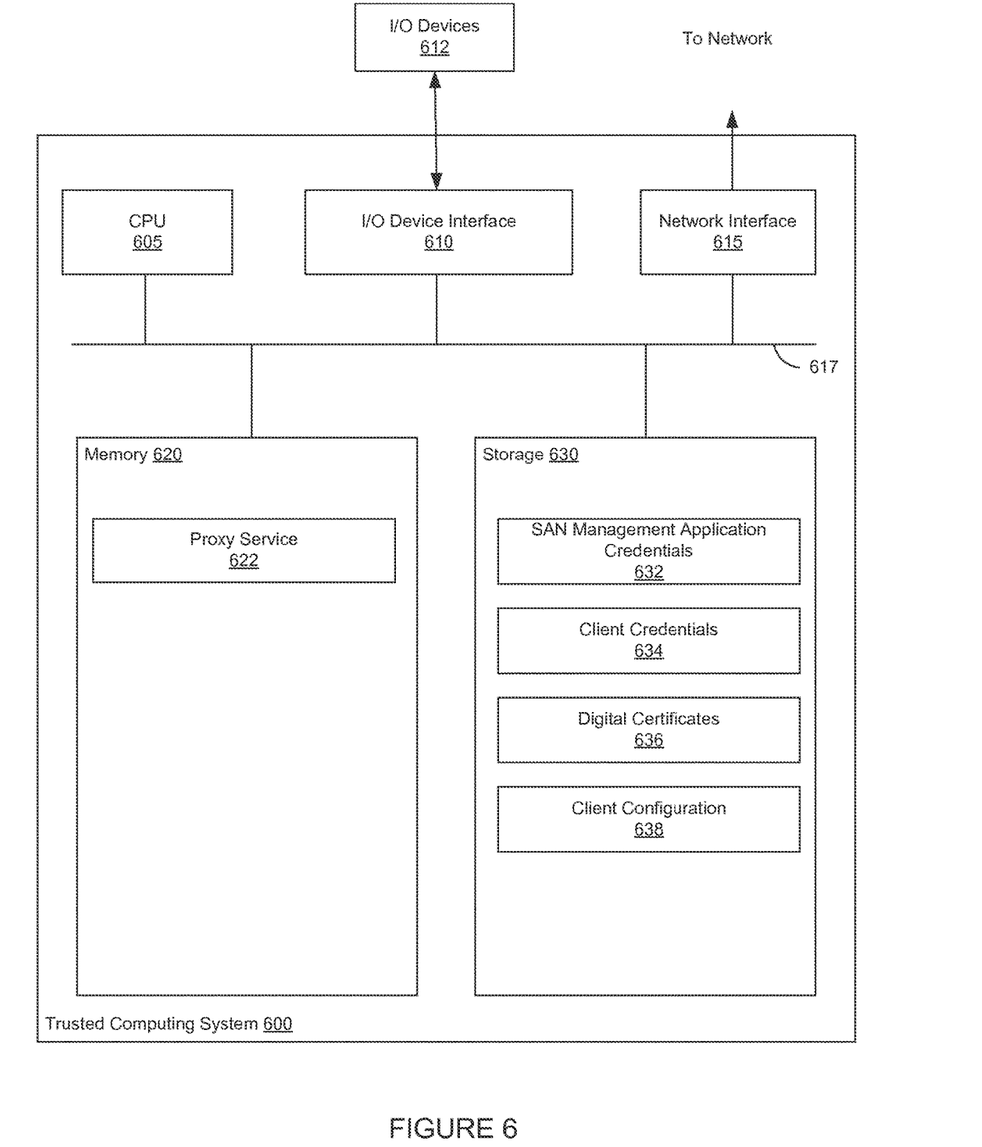
FIG. 6 illustrates a computing system configured to perform client-requested disk management operations to a SAN disk unit, according to one embodiment.

FIG. 6 illustrates a trusted computing system 600 configured to perform SAN disk management operations on behalf of a SAN client, according to one embodiment. As shown, the trusted computing system 600 includes, a central processing unit (CPU) 605, a network interface 615, a memory 620, and storage 630, each connected to a bus 617. The computing system 600 may also include an I/O device interface 610 connecting I/O devices 612 (e.g., keyboard, display and mouse devices) to the trusted computing system 600. Further, in context of this disclosure, the computing elements shown in the trusted computing system 600 may correspond to a physical computing system.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 617, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a proxy service 622. And storage 630 includes SAN management application credentials 632, client credentials 634, digital certificates 636, and a client configuration 638. The proxy service 622 may receive a request from a client of a SAN provider to perform disk management operations (e.g., snapshot, volume copy, etc.). The proxy service 622 can validate the request (e.g., via the client credentials 634, digital certificates 636, and the associated client configuration 638). Doing so allows the proxy service 622 to ensure that the client has access to the disk units specified in the request. The proxy service 622 may perform specified disk operations for requests determined to be valid.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the proxy service) or related data available in the cloud. For example, the proxy service could execute on a trusted computing system in a cloud and perform SAN disk management operations to disk units on behalf of a client of the SAN provider. In such a case, the proxy service could obtain client configuration information and store such information at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method to implement secured access to a shared storage area network (SAN), the computer-implemented method comprising:

allocating a plurality of storage disk units of the shared SAN to a plurality of clients of a SAN provider, including allocating one or more of the plurality of storage disk units to a first client of a the plurality of clients, whereafter the first client is permitted to cause input/output (I/O) operations to be performed on the one or more allocated storage disk units, wherein the shared SAN comprises a SAN shared between the plurality of clients;

receiving a first management request from the first client to perform a first disk management operation on a first of the plurality of storage disk units of the shared SAN, wherein the first management request is received by a proxy service operatively connected to a management interface of the SAN provider, wherein the management interface provides administrative access to the plurality of storage disk units;

upon authenticating the first client to access the proxy service without authenticating the first client to access the management interface, determining, by the proxy service, whether the first storage disk unit is currently allocated to the first client, based on evaluating a configuration of the first client by operation of one or more computer processors; and upon determining that the first storage disk unit is not currently allocated to a the first client, generating an indication that the first management request is denied, wherein the indication is output to the first client, wherein the first disk management operation is not performed on the first storage disk unit, thereby preventing, via the proxy service, unauthorized disk access in the shared SAN;

wherein the proxy service is configured to, upon determining that the first storage disk unit is currently allocated to the first client, cause the first disk management operation to be performed on the first storage disk unit, including:

accessing the management interface using SAN provider credentials; and executing a command via the management interface to perform the first disk management operation on the first storage disk unit.

2. The computer-implemented method of claim 1, wherein whether the first storage disk unit is currently allocated to the first client is determined in order to determine whether the first management request is valid, wherein determining whether the first management request is valid further comprises:

determining, based on the configuration, whether the first client has privileges for the first disk management operation to be performed on the first storage disk unit.

3. The computer-implemented method of claim 1, further comprising:

receiving a second management request from the first client to perform a second disk management operation on a second of the plurality of storage disk units of the shared SAN; and upon determining that the second management request is valid, causing the second disk management operation to be performed on the second storage disk unit.

4. The computer-implemented method of claim 3, wherein determining the second management request is valid comprises:

determining, based on the configuration, that the second storage disk unit is currently allocated to the first client.

5. The computer-implemented method of claim 3, wherein determining the second management request is valid comprises:

determining, based on the configuration, that the first client is authorized to perform the second disk management operation.

6. The computer-implemented method of claim 1, wherein the first client is authenticated by the proxy service prior to evaluating the configuration associated with the first client.

7. The computer-implemented method of claim 1, wherein the first disk management operation is performed without interference with any I/O path between the first client and the first storage disk unit.

8. The computer-implemented method of claim 1, wherein the first client performs I/O operations via an I/O communications path and performs management operations via a management communications path separate from the I/O communications path.

9. The computer-implemented method of claim 8, wherein the first management request is received from the first client without interfering with the I/O communications path.

10. The computer-implemented method of claim 1, wherein the management interface provides administrative access to the plurality of storage disk units regardless of allocation;

wherein the proxy service is configured to, after causing the first disk management operation to be performed on the first storage disk unit, generate an indication that the first disk management operation is performed on the first storage disk unit, wherein the indication is output to the first client.

11. The computer-implemented method of claim 10, wherein the configuration of the first client is specified in a client entry maintained by the proxy service, wherein the client entry includes a client identifier, a SAN disk range, and a SAN identifier;

wherein the first management request is sent by the first client to the proxy service based on a proxy entry maintained by the first client, wherein the proxy entry includes a client identifier, a network address of the proxy service, a proxy service user name, and a proxy service user password;

wherein the proxy service accesses the management interface based on a host entry maintained by the proxy service, wherein the host entry includes a SAN identifier, a SAN user name, and a SAN user password.

12. The computer-implemented method of claim 11, wherein whether the first storage disk unit is currently allocated to the first client is determined in order to determine whether the first management request is valid, wherein determining whether the first management request is valid further comprises:

determining, based on the configuration, whether the first client has privileges for the first disk management operation to be performed on the first storage disk unit;

wherein the computer-implemented method further comprises:

receiving a second management request from the first client to perform a second disk management operation on a second of the plurality of storage disk units of the shared SAN; and upon determining that the second management request is valid, causing, the second disk management operation to be performed on the second storage disk unit.

13. The computer-implemented method of claim 12, wherein determining the second management request is valid comprises:

determining, based on the configuration, that the second storage disk unit is currently allocated to the first client; and determining, based on the configuration, that the first client is authorized to perform the second disk management operation.

14. The computer-implemented method of claim 13, wherein the first client is authenticated by the proxy service prior to evaluating the configuration associated with the first client.

15. The computer-implemented method of claim 14, wherein the first disk management operation is performed without interference with any I/O path between the first client and the first storage disk unit;

wherein the first client performs I/O operations via an I/O communications path and performs management operations via a management communications path separate from the I/O communications path;

wherein receiving the first management request from the first client and performing the first disk management operation are completed without interfering with the I/O communications path.

16. The computer-implemented method of claim 1, wherein the management interface provides administrative access to the plurality of storage disk units regardless of allocation.

17. The computer-implemented method of claim 1, wherein the first management request is sent by the first client to the proxy service based on a proxy entry maintained by the first client.

18. The computer-implemented method of claim 1, wherein the proxy service accesses the management interface based on a host entry maintained by the proxy service.

19. The computer-implemented method of claim 18, wherein the host entry includes at least one of a SAN identifier, a SAN user name, and a SAN user password.

20. The computer-implemented method of claim 18, wherein the host entry includes at least two of a SAN identifier, a SAN user name, and a SAN user password.

* * * * *